United States Patent
Scarborough

(10) Patent No.: US 6,176,020 B1
(45) Date of Patent: Jan. 23, 2001

(54) ANTI-THERMAL EXPANSION VIAL MOUNTING SYSTEM

(76) Inventor: Dane Scarborough, 1270 Snowfly Dr., Hailey, ID (US) 83333

( * ) Notice: Under 35 U.S.C. 154(b), the term of this patent shall be extended for 0 days.

(21) Appl. No.: 09/228,774

(22) Filed: Jan. 6, 1999

Related U.S. Application Data

(60) Provisional application No. 60/070,627, filed on Jan. 7, 1998.

(51) Int. Cl.$^7$ ....................................................... G01C 9/00
(52) U.S. Cl. .................................. 33/379; 33/384; 33/385
(58) Field of Search ............................... 33/379, 380, 381, 33/382, 383, 384, 385, 386, 387, 388, 389, 390

(56) References Cited

U.S. PATENT DOCUMENTS

| | | | | |
|---|---|---|---|---|
| 250,061 | * | 11/1881 | Egart | 33/385 |
| 1,006,818 | * | 10/1911 | Worden | 33/385 |
| 1,241,399 | * | 9/1917 | King | 33/385 |
| 1,298,024 | * | 3/1919 | Ellison | 33/379 |
| 1,380,611 | * | 6/1921 | Walker | 33/379 |
| 2,102,364 | * | 12/1937 | Langsner | 33/379 |
| 4,299,035 | * | 11/1981 | Stauber | 33/386 |
| 5,111,589 | * | 5/1992 | Tate | 33/385 |
| 5,992,033 | * | 11/1999 | Scarborough | 33/384 |

* cited by examiner

*Primary Examiner*—Randy W. Gibson
(74) *Attorney, Agent, or Firm*—Gene Scott-Patent Law & Venture Group

(57) ABSTRACT

A bubble vial is mounted in a carpenter's level by a pivot rod on one side of the vial and an eccentric cam rod on the other side of the vial. The vial housing is supported in the pivot rod so as to be able to move, due to thermal expansion differences between the box frame of the assembly and the bubble vial assembly, with simple linear translation toward and away from the pivot rod and yet is not subject to twisting, torquing or rotating motions. The cam rod is eccentric so that by its rotation the vial is caused to adjust its attitude relative to the carpenter's level and thus accommodate any out of calibration condition.

10 Claims, 2 Drawing Sheets

ANTI-THERMAL EXPANSION VIAL MOUNTING SYSTEM

This application claims the filing date of a previously filed provisional application having Ser. No. 60/070,627 and an assigned filing date of Jan. 7, 1998 and which contains subject matter identical to the present application.

BACKGROUND OF THE INVENTION

1. Field of the Invention

This invention relates generally to carpenter's levels, and more particularly to a vial mounting system for such a level, the system enabling the level to compensate for temperature changes over a wide ambient temperature range.

2. Description of Related Art

The following art defines the present state of this field:

Lemile, U.S. Pat. No. 676,330 describes improvements in the construction of spirit-levels, more especially the manner of mounting the level or glass or vial, and to enable the latter to be readily adjusted vertically from the exterior and to cushion the same.

James, U.S. Pat. No. 778,130 describes improvements in spirit levels, and the object is to provide an improved construction of spirit-level having simple and effective means for attaching the liquid-tube to the support and conveniently adjusting the same.

McCain, U.S. Pat. No. 808,862 relates to leveling and plumbing instruments, and it consists of a chambered bar provided with a pivoted spirit-level and a shaft and cam for adjusting the same to an extent indicated by a pointer on the shaft.

Oswald, U.S. Pat. No. 935,807 describes an improvement in the construction of spirit level attachments, and to provide a simple, inexpensive and efficient device of this character capable of ready adjustment to arrange the bubble tubes in proper position with relation to the instrument, and adapted to permit a bubble tube to be readily removed and replaced by a new tube, should the bubble tube be broken or otherwise impaired through rough handling of the instrument.

Lofberg, U.S. Pat. No. 1,012,668 describes improvements in levels and has for its object the provision of an improved level of simple construction and efficient operation.

Ellison, U.S. Pat. No. 1,298,024 describes a spirit level which may be easily and readily applied to or detached from a level-stock, so that bricklayers, masons, or other artisans who use such leveling instruments may carry the spirit level to and from their work and apply the same to any suitable level-stock.

Hubbard, U.S. Pat. No. 2,487,245 relates to a level of the type used by carpenters, bricklayers, and other workmen erecting buildings and other structures which must be kept perpendicularly and horizontally accurate. If such levels are not carefully handled the casings or rings holding bubble glasses are liable to move out of their proper positions and the level will not be accurate.

Scheyer, U.S. Pat. No. 4,774,767 describes a water level or spirit level having at least one water level member whose angular adjustment relative to the contact surface can be changed. The water level member is rotatably mounted on the level body or a structural part fixedly connected to the level body. The water level member is fixable in the desired angular position relative to the level body or the structural parts connected to the level body. The rotatable water level member has at least one circumferentially extending flange which engages under a clamping jaw. The clamping jaw can be pressed against the surface of the flange by means of a manually operated clamping member.

Dengler, U.S. Pat. No. 4,860,459 describes a bubble level with a hollow metal section that has a circular window, in which a cylindrical level tube for a vertical level can be inserted with a positive interlock in the axial direction and can be fastened with a material interlock. A level support is inserted into the hollow section in the axial direction. The support has a cylindrical seat aligned with the window, to receive a level holder that bears a level. An interlock device is disposed between the level support and the level holder. By means of this interlock device, the level holder is mounted axially fixed, but rotatable until it is fastened by the material interlock.

Bird et al, U.S. Pat. No. 4,999,921 describes an adjustable spirit level having a plurality of spirit levels therein. A first spirit level measures vertical orientation, a second adjustable spirit level is adjustable to a true horizontal position, and a third spirit level is adjustable to any desired position between vertical and horizontal. The second level may be adjusted with a rotatable cam-shaped end piece secured within the level body, while the third level is ratcheted to a predetermined angle. The third level may be held in place by a spring member biasing the level against the level body.

Tate, U.S. Pat. No. 5,111,589 describes an adjustable plumb level formed from an I beam with wood side panels. A circular hole is formed through the I beam and side panels, within which an indicating mechanism is disposed. The indicating mechanism is easily replaceable so that the present invention can be used as a plumb or a level.

Tate, U.S. Pat. No. 5,177,873 describes an adjustable plumb level having a first gear driven by a second gear. The second gear has a smaller external diameter than does said first gear. The second gear is operatively coupled to first gear so that when an external force causes the second gear to rotate, the first gear also rotates. The first gear includes a straight vial disposed in the center thereof.

The prior art teaches the use of an adjustable vial and of a means for adjustment of the vial position in order to calibrate the leveling device. However, the use of a linear expansion joint is not taught and such ajoint enablement in combination with an excentric pivot mount is novel in the art. There is a need for a general purpose leveling tool that is able to sustain the physical shocks encountered in normal use as well as the occasional severe shocks encountered under unusual circumstances such as when the tool is dropped. There is a need for a leveling tool that is able to be easily and quickly calibrated as required. There is need for a leveling tool that is able to self adjust for thermal expansion and contraction due to its use in severe environments. The present invention fulfills these needs and provides further related advantages.

SUMMARY OF THE INVENTION

The present invention teaches certain benefits in construction and use which give rise to the objectives described below.

The present invention provides a bubble vial mounted in a carpenter's level by a pivot rod on one side of the vial and an eccentric cam rod on the other side of the vial. The vial housing is supported in the pivot rod so as to be able to move with simple linear translation toward and away from the pivot rod and yet is not subject to twisting, torquing or rotating motions. The cam rod is eccentric so that by its rotation within the box frame, the vial housing is caused to adjust its attitude relative to the carpenter's level and thus accommodate any out-of-calibration error while distortions which normally occur when the device is used under severe temperatures, due to differences in the thermal coefficients of the materials of construction, are avoided by the use of the a linear coupling mechanism.

A primary objective of the present invention is to provide a precision level having advantages not taught by the prior art.

Another objective is to provide such a level with adjustment means for accommodating climatic temperature changes which may cause the attitude sensing elements of the level to be misaligned with respect to the precision surfaces of the level.

A further objective is to provide a carpenter's level with such an adjustment means yet which is generally immune to typical mechanical shocks encountered in using of the level and which may be easily recalibrated in the field.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
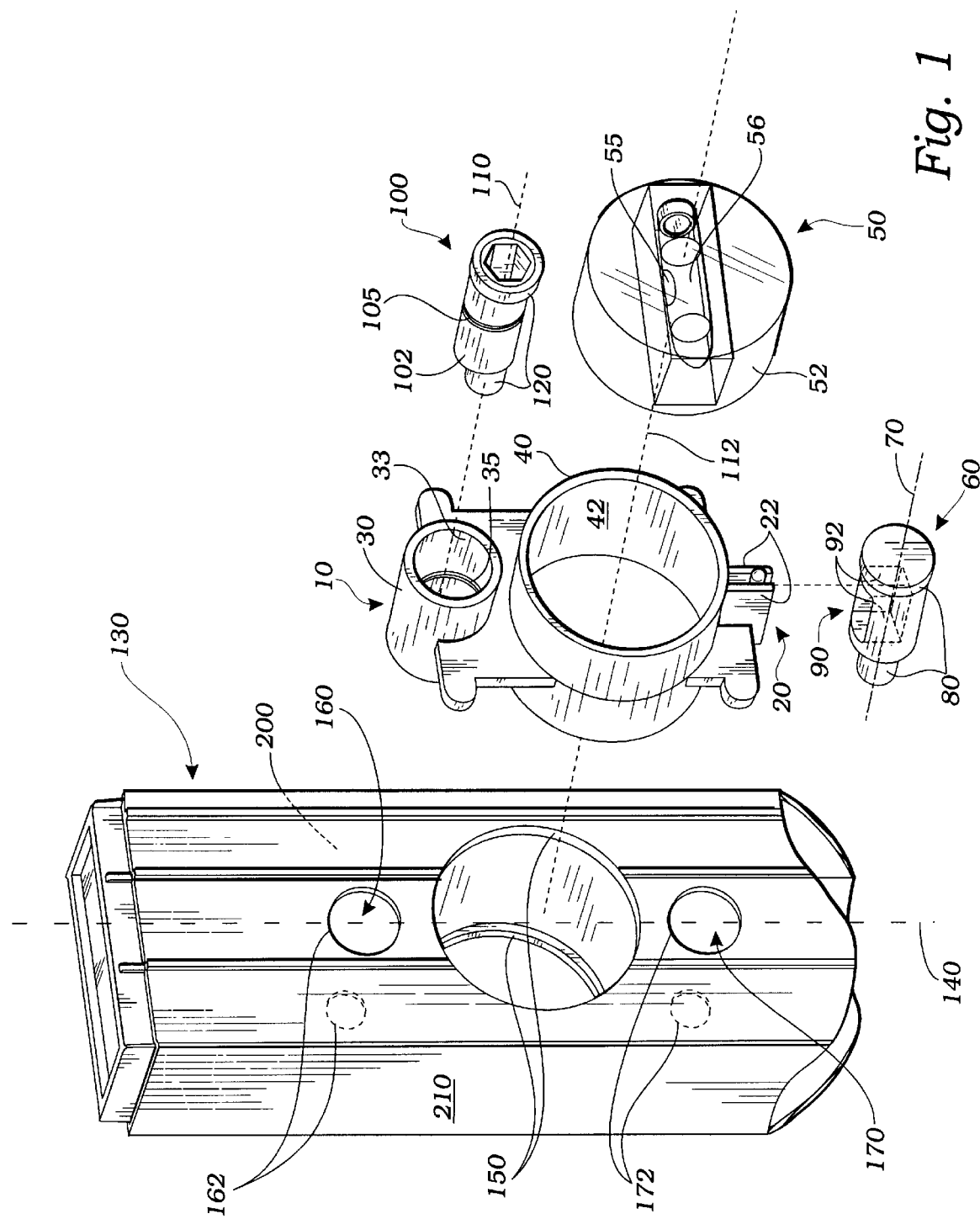
FIG. 1 is an exploded view of the present invention showing the several individual parts of the invention and the manner in which they are assembled.

The above described drawing figures illustrate the invention, an apparatus comprising: a housing 10 of a rigid structural material such as metal or plastic, providing a first linear motion coupling means 20 at a first end thereof, a means for cam mounting 30 at an opposite end thereof, and formed between the coupling means 20 and the mounting means 30, an attitude sensing means mounting means 40; an attitude sensing means 50 of a size and shape to be engaged by the attitude sensing means mounting means 40 of the housing 10; a pivot body 60 of a structural material and having a pivot body longitudinal axis 70, and, positioned concentrically with the pivot body longitudinal axis 70, a circular pivot body guide surface means 80 preferably the two surfaces shown in FIG. 1 at the lower central portion of the drawing, the pivot body 60 further comprising a second linear motion coupling means 90 functionally engagable with the first linear motion coupling means 20 so as to restrict motion of the housing 10 toward and away from the pivot body 60 to simple linear displacement as the first linear motion coupling means 20 is a tight sliding fit within the second linear motion coupling means 90 of the pivot body 60; a cam body 100 of a structural material and having a cam body longitudinal axis 110, and, positioned eccentrically with the cam body longitudinal axis 110, a circular cam body guide surface means 120, preferably the two surfaces shown in FIG. 1 at the upper right of the illustration, the cam body 100 being engaged within the cam mounting means 30 of the housing 10 in such a manner as to enable the cam body guide surface means 120 to extend from both ends of the cam mounting means 30 and wherein the a cam body circular surface 102 is in tight rotational engagement with a cam mounting means internal circular surface 33; and an elongate cylindrical enclosure 130 constructed of a rigid structural plastic, metal, or similar material in the form of a box beam, an I-beam or similar shape, as is very well known in the field of construction and carpenter's levels.

Figure 2:
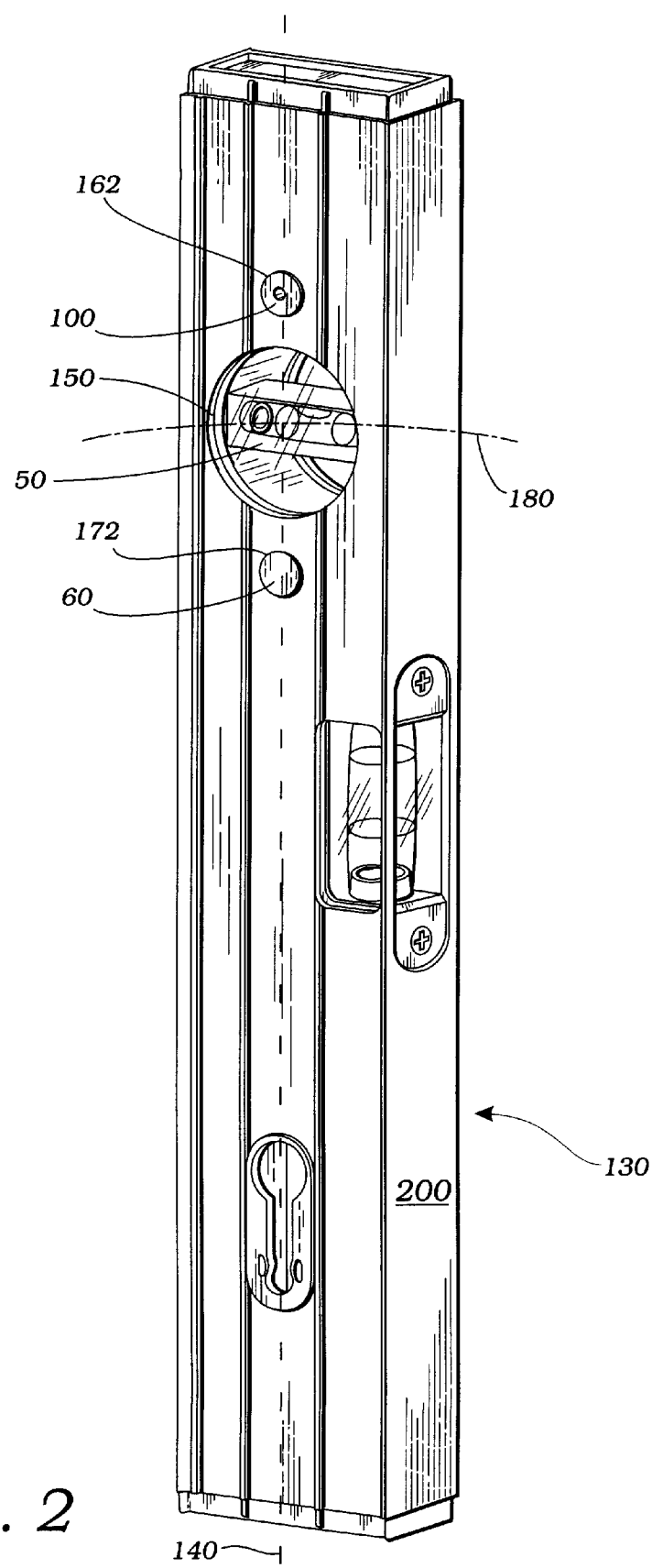
FIG. 2 is a perspective elevational view thereof as assembled.

As best seen in FIG. 2, the enclosure 130 provides an enclosure longitudinal axis 140, a viewing aperture means 150 for viewing the attitude sensing means 50, a cam engagement means 160 having an enclosure circular cam guide surface means 162 for engaging in rotational motion the circular guide surface means 120 of the cam body 100 and functional for supporting the cam body by the surface means 120 in rotational sliding engagement, and a pivot mounting means 170 having a circular pivot guide surface engagement means 172 for engaging the circular guide surface means 80 of the pivot body 60 in sliding rotational contact with the surface means 80; such that rotation of the cam body 60 within the cam guide surface means 172 of the enclosure 130 moves the attitude sensing means 50 laterally, on an arc 180 (FIG. 2), with respect to the enclosure longitudinal axis 140, the first 20 and second 90 linear motion coupling means enabling position variation thereby of the housing 10 along the longitudinal axis 140 of the cylindrical enclosure 130.

Preferably, the attitude sensing means 50 is a vial enclosing a liquid 56 having a bubble 55 therein as is well known in the field of level making. Further, the first linear motion coupling means 20 is preferably a rectangular tongue, the tongue providing a pair of spaced apart external side walls 22 directed approximately in parallel with the longitudinal axis 140 of the housing 10 when the invention is assembled, and the second linear motion coupling means 90 is a rectangular groove having spaced apart internal side walls 92 providing a sliding fit with the external side walls 22 of the tongue 20. Preferably, the cam mounting means 30 is a first cylindrical portion of the housing 10 adapted for frictional rotational engagement of the cam body 100 as has been described above and preferably has an annular protrusion 35 thereon while the cam body circular surface 102 provides a corresponding annular groove 105 so that the cam body 100 is captured in rotational engagement within the cam mounting means 30. Preferably, the attitude sensing means mounting means 40 is a second cylindrical portion of the housing 10 adapted for frictional engagement of the attitude sensing means 50 in such a manner that an attitude sensing means outer circular wall 52 is pressed into immovable contact with an attitude sensing means mounting means inner circular wall 42, and once pressed into the mounting means 40, is fixed in position with respect to the housing 10, the first and second cylindrical portions 30, 40 having parallel axes 110 and 112 such that rotation of the cam body 100 moves the sensing means on a plane.

The present invention is used in the well known manner of a carpenter's or construction level having attitude sensing means for determining level surfaces and plumb surfaces by noticing the position of the bubble 55 within the vial. However, when the invention is assembled at an ambient temperature that is significantly different from the temperature at which the level is being used, an out of calibration error is induced due to temperature related distortions in the several parts of the assembly. This occurs because of thermal expansion coefficient differences between dissimilar materials. When the vial is fixed in place there is nothing that can be done to compensate for these thermally related errors. However, the present invention enables full error compensation by adjusting the angular position of the vial relative to the enclosure's precision surfaces 200 and 210. Error checking is accomplished by placing, first one 200, and then the other 210 of the enclosures surfaces into contact with a near level or near plumb surface. If the deviation from level or plumb is greater for one measurement than for the other, it is clear that the level is introducing error. The cam body 100 is then rotated by a small amount in either the clockwise or counter clockwise senses and then the measurements are repeated. If the error appears to be larger, the rotation is reversed. If the error appears to diminish, compensation rotation of the cam body 100 is continued until the two out of level or plumb measurements are identical or no deviation from level or plumb is obtained. It is well known that the coefficient of thermal expansion for metal is much greater than that of glass and refractories, for instance the thermal coefficient of linear expansion for aluminum is 2545 per degree C. while for glass and some plastic materials it is negligible in comparison. As can be seen in FIG. 2, when a significant thermal gradient is experienced by the present invention, the box cylinder tends to change shape drastically as compared to that of the glass or plastic vial and its housing. Because the coupling means 20 and 90 enable mutual sliding linear motion to occur the vial and its housing are not distorted. In this manner, the present invention accommodates thermal changes without introducing measurement error into the apparatus.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus comprising:
   a housing providing a first linear motion coupling means at a first end thereof, a means for cam mounting at an opposite end thereof, and formed between the coupling means and the mounting means, an attitude sensing means mounting means;
   an attitude sensing means of a size and shape for engagement by the attitude sensing means mounting means of the housing;
   a pivot body having a pivot body longitudinal axis, and, positioned concentrically with the pivot body longitudinal axis, a circular pivot body guide surface means, the pivot body further comprising a second linear motion coupling means functionally engaged with the first linear motion coupling means for restricting motion of the housing toward and away from the pivot body to simple linear displacement;
   a cam body having a cam body longitudinal axis, and, positioned eccentrically with the cam body longitudinal axis, a circular cam body guide surface means, the cam body being engaged within the cam mounting means of the housing;
   a cylindrical enclosure providing an enclosure longitudinal axis, a viewing aperture means for viewing the attitude sensing means, a cam engagement means having an enclosure circular cam guide surface means for engaging the circular guide surface means of the cam body, and a pivot mounting means having a circular pivot guide surface engagement means for engaging the circular guide surface means of the pivot body;
   such that rotation of the cam body within the cam guide surface means of the enclosure moves the attitude sensing means with respect to the enclosure, the first and second linear motion coupling means enabling position variation of the housing such that differences in thermal expansion and contraction between the cylindrical enclosure and the housing are accommodated by linear adjustment of the first and second linear motion coupling means.

2. The apparatus of claim 1 wherein the attitude sensing means is a vial enclosing a liquid having a bubble therein.

3. The apparatus of claim 1 wherein the first linear motion coupling means is a rectangular tongue, the tongue providing a pair of spaced apart external side walls directed approximately in parallel with the longitudinal axis of the housing and the second linear motion coupling means is a rectangular groove having spaced apart internal side walls providing a tight sliding fit with the external side walls of the tongue.

4. The apparatus of claim 1 wherein the cam mounting means is a first cylindrical portion adapted for frictional engagement of the cam body.

5. The apparatus of claim 4 wherein the attitude sensing means mounting means is a second cylindrical portion adapted for frictional engagement of the attitude sensing means, the first and second cylindrical portions having parallel axes.

6. An apparatus comprising:
   a housing providing a first linear motion coupling means at a first end thereof, a means for cam mounting at an opposite end thereof, and engaged between the coupling means and the mounting means, an attitude sensing means
   a pivot body providing a circular pivot body guide surface means, and a second linear motion coupling means functionally engaged with the first linear motion coupling means so as to restrict motion of the housing to simple linear displacement;
   a cylindrical enclosure providing a viewing aperture means for viewing the attitude sensing means, a pivot mounting means having a circular pivot guide surface engagement means for engaging the circular guide surface means of the pivot body and a cam body engaging means;
   a cam body enabled for engaging the cam mounting means of the housing in simple rotational motion and engaging the cam body engaging means of the cylindrical enclosure in excentric rotational motion;
   the first and second linear motion coupling means enabling linear position variation of the housing, and rotation of the cam body enabling calibration of the attitude sensing means.

7. The apparatus of claim 6 wherein the attitude sensing means is a vial enclosing a liquid having a bubble therein.

8. The apparatus of claim 6 wherein the first linear motion coupling means is a rectangular tongue, the tongue providing a pair of spaced apart external side walls directed approximately in parallel with the longitudinal axis of the housing and the second linear motion coupling means is a rectangular groove having spaced apart internal side walls providing a tight sliding fit with the external side walls of the tongue.

9. The apparatus of claim 6 wherein the mounting means is a first circular cylindrical portion.

10. The apparatus of claim 1 wherein the attitude sensing means mounting means is a second cylindrical portion adapted for frictional engagement of the attitude sensing means, the first and second cylindrical portions having parallel axes.

* * * * *